J. A. RAMSEY.
TWINE SAVING ATTACHMENT FOR THRESHING MACHINES.
APPLICATION FILED MAY 9, 1914.
1,121,398.  
Patented Dec. 15, 1914.
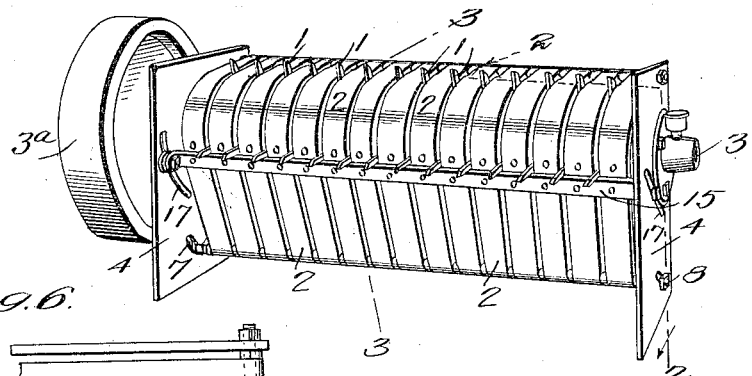
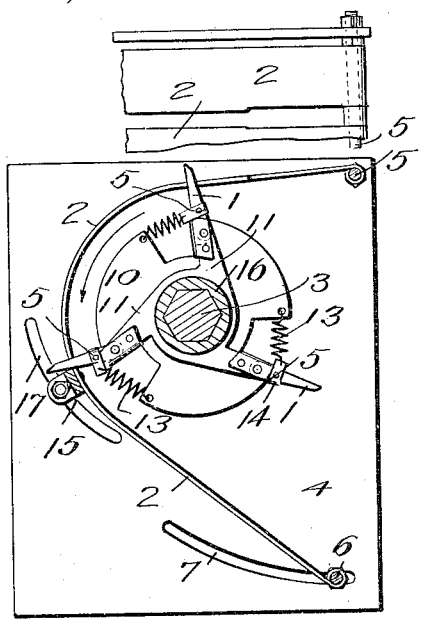
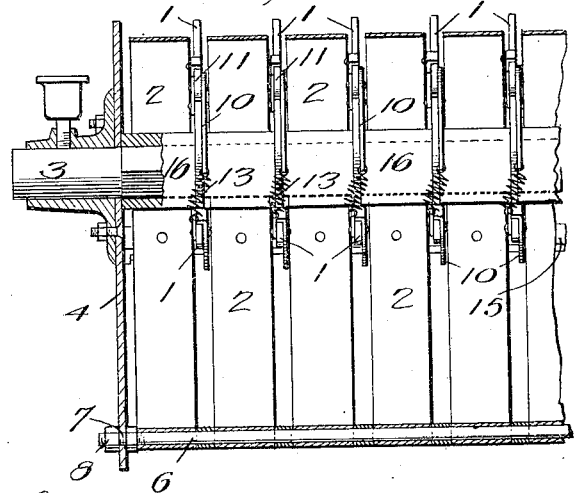
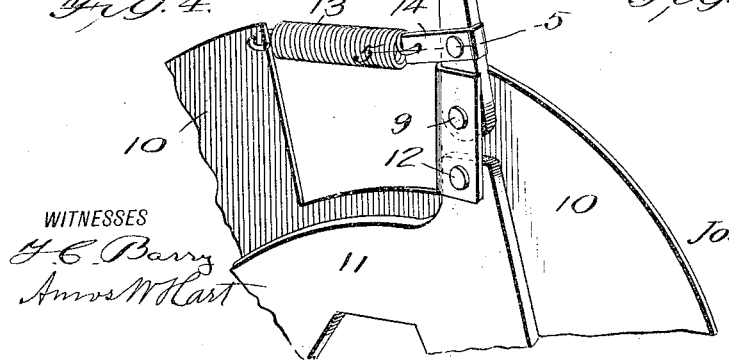
WITNESSES
INVENTOR  
Joseph A. Ramsey  
BY Munn & Co.  
ATTORNEYS

UNITED STATES PATENT OFFICE.

JOSEPH A. RAMSEY, OF BEATRICE, NEBRASKA.

TWINE-SAVING ATTACHMENT FOR THRESHING-MACHINES.

1,121,398.  Specification of Letters Patent.  Patented Dec. 15, 1914.

Application filed May 9, 1914. Serial No. 837,423.

*To all whom it may concern:*

Be it known that I, JOSEPH A. RAMSEY, a citizen of the United States, and a resident of Beatrice and county of Gage, State of Nebraska, have made an Improvement in Twine-Saving Attachments for Threshing-Machines, of which the following is a specification.

My invention is an apparatus for removing twine from bundles of grain while being fed to a threshing cylinder. In practice, it is located directly in front of the toothed cylinder and concave where the "retarder" is ordinarily located in threshing-machines of the latest type. In other words, it is located between the band or twine cutters and the threshing cylinder, and below their plane, so that the grain bundles slide over it on their way to the cylinder. In such passages a series of rotary fingers constituting part of the apparatus, come in contact with the lengths of twine which have been severed by the cutters and draw them down away from the grain bundles so that they are deposited in a receptacle provided for the purpose.

In the accompanying drawing: Figure 1 is a perspective front view of the twine saver, or separator, as it may be denominated. Fig. 2 is an enlarged longitudinal vertical section of a portion of the separator taken on the line 2—2 of Fig. 1. Fig. 3 is an enlarged cross section on line 3—3 of Fig. 1. Fig. 4 is a perspective view of one of the twine-removing teeth or fingers, together with its retracting spring and the holder to which the finger is pivoted. Fig. 5 is a cross section on the line 5—5 of Fig. 4. Fig. 6 is a plan view of a portion of the top of the slotted guard constituting part of the separator or twine-saver.

The two most prominent features of the apparatus are the teeth or fingers 1, and the slotted guard 2. The fingers are pivoted to holders mounted on, and revolving with, the horizontal shaft 3, and the slotted guard is held in bent or curved form between parallel vertical plates 4—4 in which the shaft 3 has its bearing. A fly-wheel $3^a$ is mounted on the shaft 3 and the latter may be driven by a suitable gear—which it is unnecessary to describe.

The guard 2 may be produced economically by stamping it out of a sheet of steel, or it may be produced from a steel plate by milling the slots therein. The plate thus slotted is then bent into the form shown in Figs. 1 and 6, where the upper portion of the guard is nearly horizontal, and its upper end is attached to a transverse rod or bar 5 that extends through and is bolted to the plates 4—4. The lower end of the guard is attached to a bar 6 which extends through arc-slots 7 and is provided with nuts 8, as shown in Figs. 1 and 2, for clamping the rod in any adjustment. It is obvious that this construction and arrangement permit the guard to be adjusted so that its top portion will be nearer to or farther from the horizontal and that its curvature may thus have a greater or less radius relative to the teeth or fingers 1, so that the latter will enter the grain bundles a greater or less depth.

The teeth or fingers 1 are pivoted at 9 (see Fig. 4) to plate disks 10, which are provided with peripheral notches adjacent to the teeth. These disks 10 are in turn riveted to cast-metal plates 11 having radial fingers and a polygonal opening which adapts them to fit on the polygonal shaft 3. The disks 10 and plates 11 are riveted together at 12 adjacent to the pivots of the fingers 1. These two parts 10 and 11 thus constitute a rigid holder and support for the teeth 1. A spiral retracting spring 13 is provided for each tooth, the same extending across the notch in the disk 10 which is adjacent to every tooth. The spring is attached to the tooth by means of a metal plate 14 (see especially Figs. 4 and 5.)

The operation of the apparatus is briefly described as follows:—The grain bundles, passing from the cutters which have severed the twine previously binding them, slide over the top of the guard 2 in the direction of the arrow, Fig. 3, and the shaft 3, rotating in the same direction, carries fingers 1 around so that they sweep through the slots of the guard in its curved portion, and thus reach into the bundles and engage the twine and draw it down out of the bundles until they strike the bar 15 (see Figs. 1 and 6) which extends across the front of the guard and is secured thereto. In other words, the fingers gather the twine lengths and draw them out of the bundle and the twine is freed from the teeth by striking on the bar 15, and is then deposited in a box or receptacle provided for the purpose. The ends of the bars extend through slots 16 in the plate 4, which construction permits adjustment of the guard, as before described with reference to the bar 6 and arc slot 7. It will be understood that in this contact of the teeth with the bar 15 they are thrown back until they pass the same, which action is permitted by the springs 13 which subsequently retract them to the normal radial position.

The upper ends of the slots in the guard which are adjacent to the upper bar 5 are somewhat enlarged or widened as indicated in Fig. 6, in order to afford passage for the teeth or fingers 1, without binding, upon their entrance into the guard. It is apparent that the bars 5—6 and 15 serve to connect and brace apart the parallel end plates 4. Between the series of teeth- or finger-holders comprising parts 10 and 11, there are interposed sleeves 16, as will be understood by reference to Figs. 2 and 3, said sleeves thus serving to hold the teeth-holders duly spaced apart.

What I claim is:—

1. A twine-remover and saver comprising a slotted guard, a horizontal rotatable shaft extending beneath the top portion of said guard, and a series of spring-retracted fingers pivoted to supports on the shaft and rotating with said shaft and projecting, in a part of their revolution, through the slots of the guard, as described.

2. A twine-remover and saver comprising a slotted guard, a horizontal rotatable shaft extending beneath the top portion of said guard, a series of spring-retracted fingers pivoted to supports on the shaft and rotating with said shaft and projecting, in a part of their revolution, through the slots of the guard, and a contact bar applied to the lower portion of the guard for assisting in freeing twine from the fingers, as described.

3. In a twine-saver adapted for application to threshing-machines, the combination with a horizontal shaft, and spring-retracted fingers applied thereto and adapted to rotate therewith, a slotted guard over which the grain bundles pass, end plates to which the upper portion of the guard is secured, said plates being provided with arc-slots, and the lower portion of the guard attached to a bar projecting through said slots and having means for clamping it in any required adjustment.

4. A twine-remover and saver comprising a horizontal shaft provided with fingers, a guard provided with slots through which said fingers are adapted to sweep, parallel end plates provided with arc-slots, and bars attached to the guard and projecting through, and adapted to be clamped in, said arc-slots, as described.

JOSEPH A. RAMSEY.

Witnesses:
H. E. SACKETT,
M. S. ANCONA.

Copies of this patent may be obtained for five cents each, by addressing the "Commissioner of Patents, Washington, D. C."